United States Patent
Lace

3,716,774
Feb. 13, 1973

[54] VEHICLE POWER SUPPLY SYSTEM WITH VOLTAGE REGULATOR LOAD COMPENSATION

[75] Inventor: Melvin A. Lace, Prospect Heights, Ill.

[73] Assignee: Motorola, Inc., Franklin Park, Ill.

[22] Filed: Aug. 2, 1971

[21] Appl. No.: 168,242

[52] U.S. Cl. .................... 320/64, 322/25, 322/27, 322/28, 322/79
[51] Int. Cl. ................................................ H02p 9/30
[58] Field of Search .............. 322/25, 27, 28, 73, 79; 320/61, 64, 68

[56] References Cited

UNITED STATES PATENTS

| | | | |
|---|---|---|---|
| 3,593,102 | 7/1971 | Kawashima | 322/28 |
| 3,521,148 | 7/1970 | Kirk et al. | 322/28 |
| 3,069,616 | 12/1962 | Curtis | 322/25 |

Primary Examiner—J. D. Miller
Assistant Examiner—H. Huberfeld
Attorney—Vincent Rauner et al.

[57] ABSTRACT

A power supply system for a vehicle providing power to a load remotely located therefrom and connected to the system by conductors having a predetermined voltage loss includes an electronic regulator circuit which controls the output voltage of the system. The regulator circuit is connected to sense the voltage drop across a rectifying diode connected to the output of the AC generator of the system, which varies in accordance with the current output of the generator, and in accordance therewith varies the output voltage of the system to compensate for the loss in said conductors.

8 Claims, 1 Drawing Figure

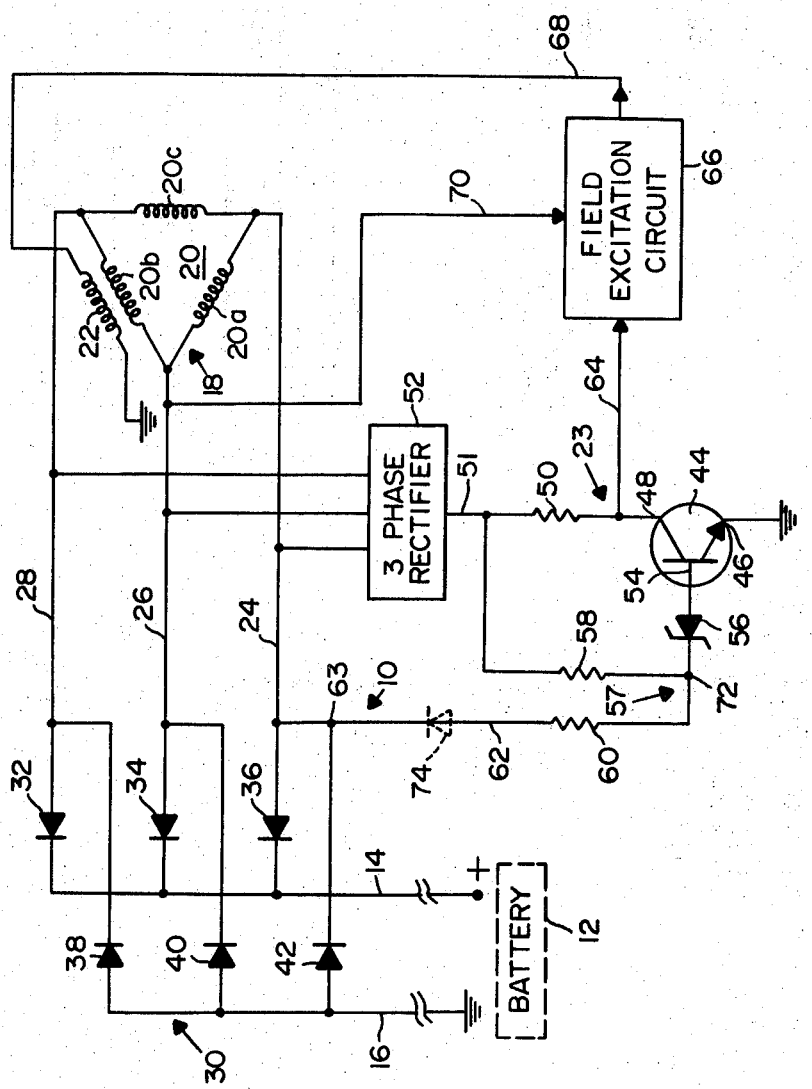

VEHICLE POWER SUPPLY SYSTEM WITH VOLTAGE REGULATOR LOAD COMPENSATION

BACKGROUND OF THE INVENTION

This invention relates generally to power supply systems used in vehicles and more particularly to voltage regulator circuitry for use with such systems for controlling the output thereof to power an electrical load.

Vehicle alternator systems generally employ a voltage regulator to assure that the output voltage from the alternator is suitable for proper charging of the vehicle battery and to power electrically operated accessories therein. The voltage regulator is mounted normally near the alternator in the engine compartment of the vehicle. In the case where the battery to be charged is also mounted in the engine compartment in close proximity to the alternator, satisfactory charging thereof is obtained. However, where the battery is remotely situated from the alternator, such as in the case of a semi-trailer truck, the voltage loss of the cables connecting the battery to the alternator can be of sufficient magnitude that the actual voltage applied to the terminals of the battery is substantially less than the output voltage of the alternator. The latter causes poor charging of the battery and may, in some cases, permit the battery to become discharged.

A solution to the above problem is to mount the voltage regulator directly on the battery. However, this requires additional wiring which may be impractical and disadvantageous.

SUMMARY

Accordingly, it is a primary object of the present invention to provide a new and improved power supply system for use in a vehicle for charging the vehicle battery or powering an electrical load remotely situated from the regulator which overcomes the drawbacks discussed above.

It is another object of the present invention to provide a new and improved power supply system of the above-described type which is no greater in cost than a conventional arrangement.

Briefly, a preferred embodiment of the vehicle power supply system according to the present invention includes electronic voltage regulator circuitry operable to control the supply of charging current from an alternator to a remotely situated battery or electrical load. The regulator circuitry is connected to one of the output phases of the alternator. The connection may be accomplished either directly or through a diode and to a phase leading the phase providing excitation current to the field. When the phase voltage at the phase connected to the regulator circuit becomes negative, on negative half-cycles of the generated alternating current, current flows through the negatively poled rectification diode connected to the phase, thereby clamping the regulator connection to a negative voltage equal to one diode junction drop below ground. When no current is being drawn by the load, the diode drop is a first predetermined value. At maximum current output from the alternator, the diode drop will increase due to the increased current flow through the diode. Hence, the ground reference for the voltage regulator circuit which is used to drive the field excitation circuit has a variable reference voltage. Thus, as the current drawn from the alternator is increased, the increased negative voltage applied to the regulator circuit delays the turn off time of circuitry for exciting the field winding, thereby increasing the length of time that the field is excited. The latter increases the alternator output voltage to compensate for the increased voltage drop across the battery cables.

DESCRIPTION OF THE DRAWING AND DETAILED DESCRIPTION

Referring now to the single FIGURE of the drawing which is a schematic diagram illustrating a vehicle power supply system according to the invention, generally designated by the numeral 10 for supplying current to an electrical load, which requires constant voltage, herein taking the form of a battery 12.

The battery 12 is connected to the power supply system 10 via cables or conductors 14, 16 which are shown in broken lines to represent the fact that they are significantly long, such as, for example, of a length normally found in a semi-trailer truck or the like vehicle.

The power supply system 10 includes the usual elements such as an AC voltage generator or alternator 18 having a stator 20 including three phase windings 20a, 20b, 20c shown for illustrative purposes only in a delta configuration, and a rotatable field winding 22.

The AC output of the alternator is fed via output leads 24, 26, 28 through the usual full wave rectification arrangement 30 including two sets of three oppositely poled diode rectifiers 32, 34, 36 and 38, 40, 42, respectively, to leads 14, 16 connected to battery 12.

An electronic voltage regulator 23 is employed in the vehicle power supply system according to the invention to control the output of the alternator 18. The regulator circuit includes a transistor 44 having a grounded emitter electrode 46 and a collector electrode 48 connected through a resistor 50, lead 51 and a three phase rectifying circuit 52 to the output leads 24, 26, 28 of the alternator. The base electrode 54 of the transistor is connected through a zener diode 56 and a voltage divider network 57 including resistors 58, 60 and is connected via lead 62 at junction 63 to output lead 24 and one of the phase windings (20a) of the alternator 18.

The output lead 64 of the transistor 44 of the regulator circuit is connected to a field excitation circuit 66 of a conventional type which is connected over lead 68 to one side of the field winding 22 of the alternator; the opposite side of the field winding being connected to ground potential. A lead 70 connected to another output lead 26 of the alternator 18 is connected to the field excitation circuit 66 also for passing excitation current to the field winding 22 when necessary, as controlled by the regulator 23.

In operation, the rectified output of the alternator stator winding is fed via lead 51 to the regulator circuit. The voltage is divided down by network 57 and applied at junction 72. The zener diode 56 connected thereat has a predetermined breakdown voltage which when exceeded by the voltage applied thereto, causes it to breakdown, thereby to operate transistor 44. The operation of transistor 44 in turn causes the field excitation circuit 66 to turn off and interrupt the flow of excitation current from the single phase (20b) of the alternator via lead 70 to the field winding 22.

Because of the length of conductors 14, 16 a voltage loss is present thereacross. Consequently, the voltage at the output of the alternator is greater than that at the load, in this case, battery 12. As such, the voltage at battery 12 does not reach the fully charged level, but is less than fully charged due to the premature cessation of the current flow from the alternator.

To compensate for the voltage drop due to the long conductors 14, 16, the regulator circuit 23, as described heretofore, is connected via lead 62 at junction 63 to an output lead of another of the phases (20a) of the alternator stator winding 20. Since the forward voltage drop across the rectifier diodes 32–42 is dependent on the current supplied by the alternator, the voltage at junction 63 changes proportionally thereto as well. When the voltage at junction 63 becomes negative, on negative half-cycles of the generated AC, current flows through diode 42, thereby clamping junction 63 to a negative voltage equal to one diode drop below ground. When no current is being drawn by the battery 12, the diode drop is at a predetermined value, herein approximately 0.7 volts. At maximum current output of the alternator, the diode drop increases herein to approximately 1.2 volts, due to increased current flow through diode 42. Hence, the voltage at junction 72, which controls the operation of zener diode 56 is varied in accordance with current being drawn from the alternator. The increased negative voltage applied to resistor 60 delays the turn-on time of zener diode 56, thereby increasing the length of time the field is excited by the field excitation circuit. The latter increases the alternator output voltage to compensate for the voltage loss due to the long cables 14, 16.

It should be noted that the rectification diodes may be chosen with specific voltage drops for cables of varying lengths. The selection of particular diodes for corresponding cable lengths will be obvious to one skilled in the art. The values of 0.7 volts and 1.2 volts with regard to the voltage drop across diode 42 shown in the figure of the drawing is a typical example for a standard semi-trailer type truck using standard length cables.

It should further be noted that the alternator output phase to which the connection (lead 62) to the regulator circuit is made must lead the voltage of the supplying excitation current to the field for efficient regulation of the output of the system.

A diode 74, shown in dotted lines, may be inserted into lead 62 to prevent positive voltages from the alternator from turning on transistor 44 inadvertently. This diode is required with some forms of field excitation circuits.

Thus, the vehicle power supply system according to the invention provides a relatively simple, efficient means for supplying current to a load requiring constant voltage, and which is located remotely from the system and connected thereto over relatively long conductors or cables.

No additional components other than those used in a conventional vehicle power supply system are required in the subject invention, thus the cost of such a system is no more than that of the conventional system.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A power supply system for supplying a remotely positioned electrical load requiring a constant voltage, said load being connected to said system by elongated conductors of a predetermined length having a predetermined voltage loss, said system including in combination: AC voltage generating means having an output, rectifying means connected to said output and to said electrical conductors, and regulating means connected to said voltage generating means for regulating the latter to provide a corresponding voltage output from said system, said regulating means being coupled to the output of said generating means for sensing the voltage drop across said rectifying means, said regulating means varying the output voltage of said system proportionally to the voltage drop so as to compensate substantially for the voltage loss in said elongated conductors.

2. A power supply system as claimed in claim 1 wherein said rectifying means include a diode having a voltage drop thereacross which varies in accordance with the current output of said generating means, thereby to vary the output voltage of said system in accordance therewith.

3. A power supply system as claimed in claim 2 wherein said voltage generating means includes a three phase alternator having a field, wherein one of said phases is connected to the field of said alternator to provide excitation current therefor and wherein said regulating means is connected to a phase of said alternator output leading the phase supplying said field.

4. A power supply system as claimed in claim 2 wherein said electrical load comprises a battery and wherein said voltage generating means provides charging current to said battery.

5. A vehicle power supply system for providing charging current to a remotely located electrical load, said electrical load being connected electrically to said system via conductors having a predetermined voltage loss, said system including in combination: an AC voltage generating means having a three phase output rectifying means including a plurality of diode means, connected to the output phases of said generating means and to said electrical conductors for supplying a rectified output to said load, each of said diode means having a voltage drop thereacross which varies in accordance with the current output of said generating means, and regulating means connected to said system for regulating the output thereof to provide a predetermined output voltage, said regulating means connected to one of said phases for sensing the voltage drop across a corresponding diode means, said regulating means varying the level of said output voltage proportionally to the voltage drop across said diode means, thereby to compensate for the voltage loss of said electrical conductors.

6. A vehicle power supply system as claimed in claim 5 wherein said AC generating means further includes field winding means coupled to a predetermined output phase of said AC generating means for receipt of excitation current therefrom, and wherein said regulating means is connected to another of said output phases leading said phase connected to said field winding means electrically.

7. A vehicle power supply system as claimed in claim 6 wherein said regulating means includes means for setting a reference voltage for limiting the output voltage of said system, wherein said regulating means senses the output voltage of said system and compares a sensed voltage with said reference voltage for controlling the output voltage and wherein said diode means include a negatively poled rectifying diode having a negative voltage drop, said negative voltage drop decreasing the value of the voltage sensed by the regulating means, thereby increasing the output voltage accordingly.

8. A power supply system for providing power to an electrical load requiring a constant voltage, remotely located from said system and connected thereto hy elongated electrical conductors having a predetermined voltage loss, said system including in combination: AC generating means, rectifying means connected to the output of said generating means and said elongated conductors, the voltage drop across said rectifying means varying with the current output of said generating means, and regulating means for controlling the output voltage of said system, said regulating means being connected to sense the voltage drop across said rectifying means and to vary the output voltage of said system in accordance therewith, thereby to compensate for the voltage loss in said elongated electrical conductors.

* * * * *